March 5, 1946. L. G. ALLISON 2,395,796
PROJECTOR STAND ASSEMBLY
Filed Dec. 24, 1943 3 Sheets-Sheet 1

Inventor
Lloyd G. Allison
By Henry G. Dybvig
Attorney

March 5, 1946.   L. G. ALLISON   2,395,796
PROJECTOR STAND ASSEMBLY
Filed Dec. 24, 1943   3 Sheets-Sheet 3

Inventor
Lloyd G. Allison
By Henry G. Dybvig
Attorney

Patented Mar. 5, 1946

2,395,796

UNITED STATES PATENT OFFICE 2,395,796

PROJECTOR STAND ASSEMBLY

Lloyd G. Allison, Tampa, Fla., assignor to Willard C. Moore, doing business as Moore Equipment Company, Dayton, Ohio Application December 24, 1943, Serial No. 515,619

5 Claims. (Cl. 248—11)

This invention relates to a movable mounting and more particularly to a mounting that is adapted for movement in three planes forming a trihedral angle, as for example, a mounting for a projector used in training aviators, as well as a mounting for other devices.

In the training of cadets for airplane pilots and the like, it may be desirable to project an image upon a screen, the position and the angular relation of the image on the screen being under the control of the instructor. Such an image may be used in depicting the flight of an airplane, showing the movement of a surface vehicle, either on land or on water, or for illustrating the movement of a projectile passing through space.

An object of this invention is to provide a mounting for a projector, which mounting allows for the movement or adjustment of the projector in three planes that may be substantially normal to each other.

Another object of this invention is to provide pneumatic or hydraulic control means for actuating a device having oscillatory movement in three planes.

Another object of this invention is to provide a device that is remotely controlled, which device has movements in three planes responding to predetermined movements at a control station.

Other objects and advantages reside in the construction of parts, the combination thereof and the mode of operation, as will become more apparent from the following description.

Before discussing the details of the structure, the principle upon which the structure is constructed will be described briefly. The structure provides a support for a projector such that the projector may be oscillated in three planes at right angles to each other. This has been accomplished by providing three stages of mechanism, such that the first stage is used in oscillating the projector in one plane, a second stage being used in oscillating the projector in a plane normal to the first plane, or substantially so, and the third stage being used in oscillating the projector in a third plane normal to the first two planes. Each stage consists of a motor and a bracket pivotally mounted for oscillation in one plane, the bracket being driven by the motor. The bracket and the motor in the first stage are mounted upon the main support for all of the stages. The motor and the bracket of the second stage are mounted upon the bracket found in the first stage, so that the bracket of the first stage provides the entire support for the bracket and the motor in the second stage. The bracket and the motor of the third stage are mounted upon the bracket found in the second stage, so that the bracket in the second stage forms the support for the mechanism in the third stage. This results in a structure such that when the motor in the third stage is actuated, it only oscillates the bracket in the third stage, causing a relative movement of the bracket in the third stage with respect to the bracket found in the second stage. The projector is supported on the bracket found in the third stage. When the motor in the second stage is actuated, it oscillates the bracket in the second stage. This results in the bracket and the motor of the third stage moving with the bracket in the second stage and thereby oscillating the projector. However, there is no relative movement between the bracket in the third stage and the bracket in the second stage when the motor in the second stage is oscillated. When the motor in the first stage is actuated, it oscillates the bracket in the first stage. In view of the fact that the bracket of the second stage and the motor of the second stage are mounted on the bracket of the first stage, oscillatory movement of the bracket of the first stage will oscillate the projector through the bracket in the third stage and the bracket in the second stage. This will appear more fully from the detailed discussion of the structure used.

Figure 1:
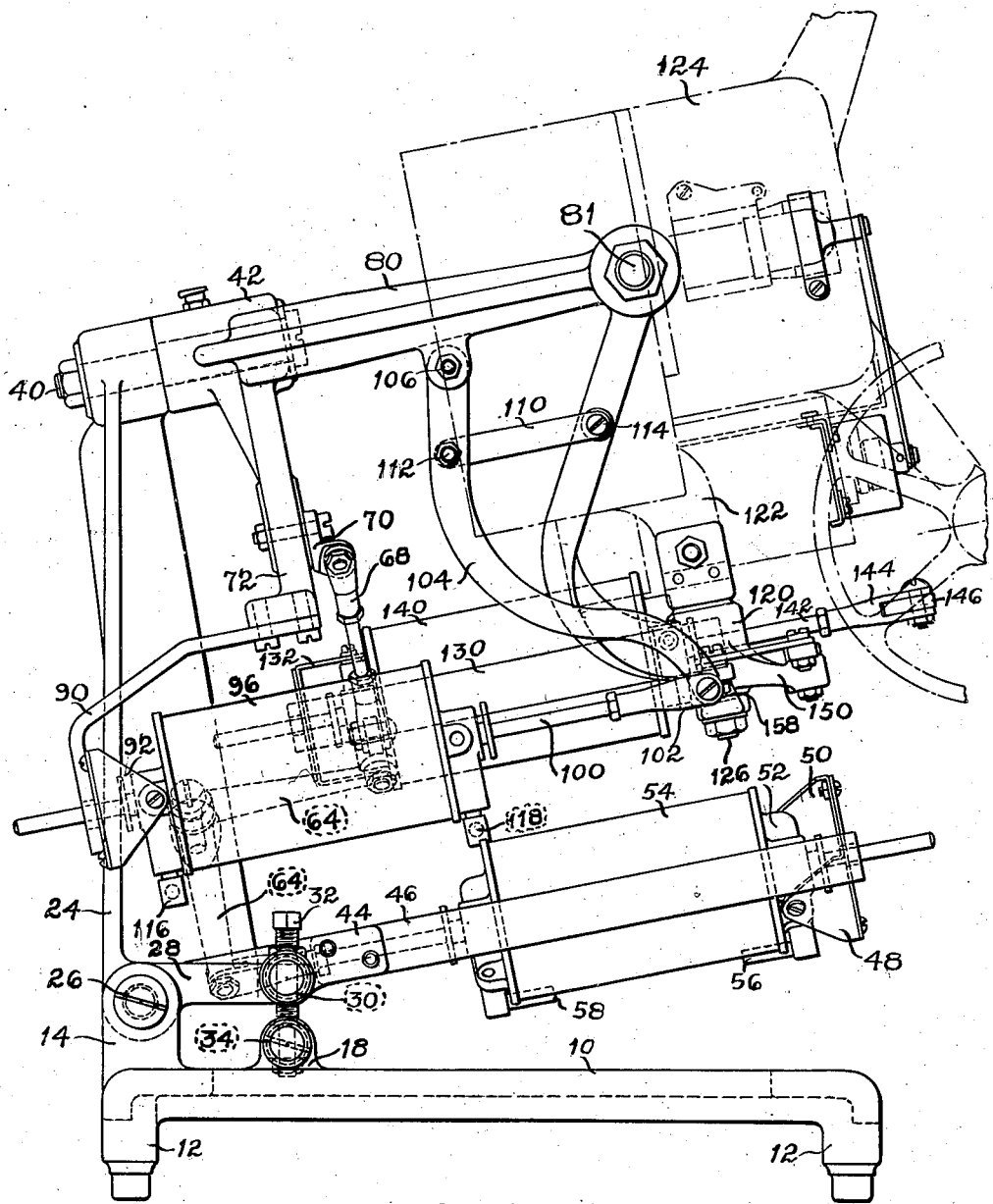
Figure 1 is a side elevational view of the mounting device for a projector.

Referring to the drawings, the reference character 10 indicates the base having a plurality of legs 12 and a pair of upwardly projecting ears 14 and 16 integral therewith. The base also has a pair of smaller ears 18 and 20. A standard 24 is mounted on a pivotal bolt or axle member 26 extending through apertures in the upwardly directed ears 14 and 16. The standard 24 is provided with a pair of arms 28, as best seen in Figure 1, supporting a spanning member 30 threadedly engaging an adjusting screw 32 having its lower end mounted in a spanning member 34 journalled in the ears 18 and 20. The angular position of the standard 24 may be adjusted with respect to the plane of the base 10 by adjusting the screw 32. The image of the projector may thereby be adjusted to a predetermined area with respect to the screen, as will appear more fully later. The standard 24 has fixedly attached in its top a bolt 40, forming a journal for an oscillatory bracket member 42 mounted for oscillatory movement with respect to the standard 24, and oscillated by a mechanism that will now be described.

Near the base of the standard 24 is a second arm 44 integral with the standard 24, which arm 44 supports a mounting bracket 46 having attached thereto a pair of angular brackets 48 and 50 having journalled therein the end frame 52 of a cylinder 54 having a pair of fluid intake openings or passages 56 and 58, one in each end, which intake passages may be connected by flexible conduits to a remote control station. A piston rod 60 extends through the cylinder and has fixedly attached thereto a piston, not shown, within the cylinder. The piston rod is adjustably attached to a bifurcated coupling unit 62 pivotally attached to a bell crank lever 64 pivoted at 66 upon the standard 24. The other arm of the bell crank lever 64 is pivotally attached to a link 68 connected through a bracket 70 to an arm 72 integral with the oscillatory bracket member 42.

Figure 2:
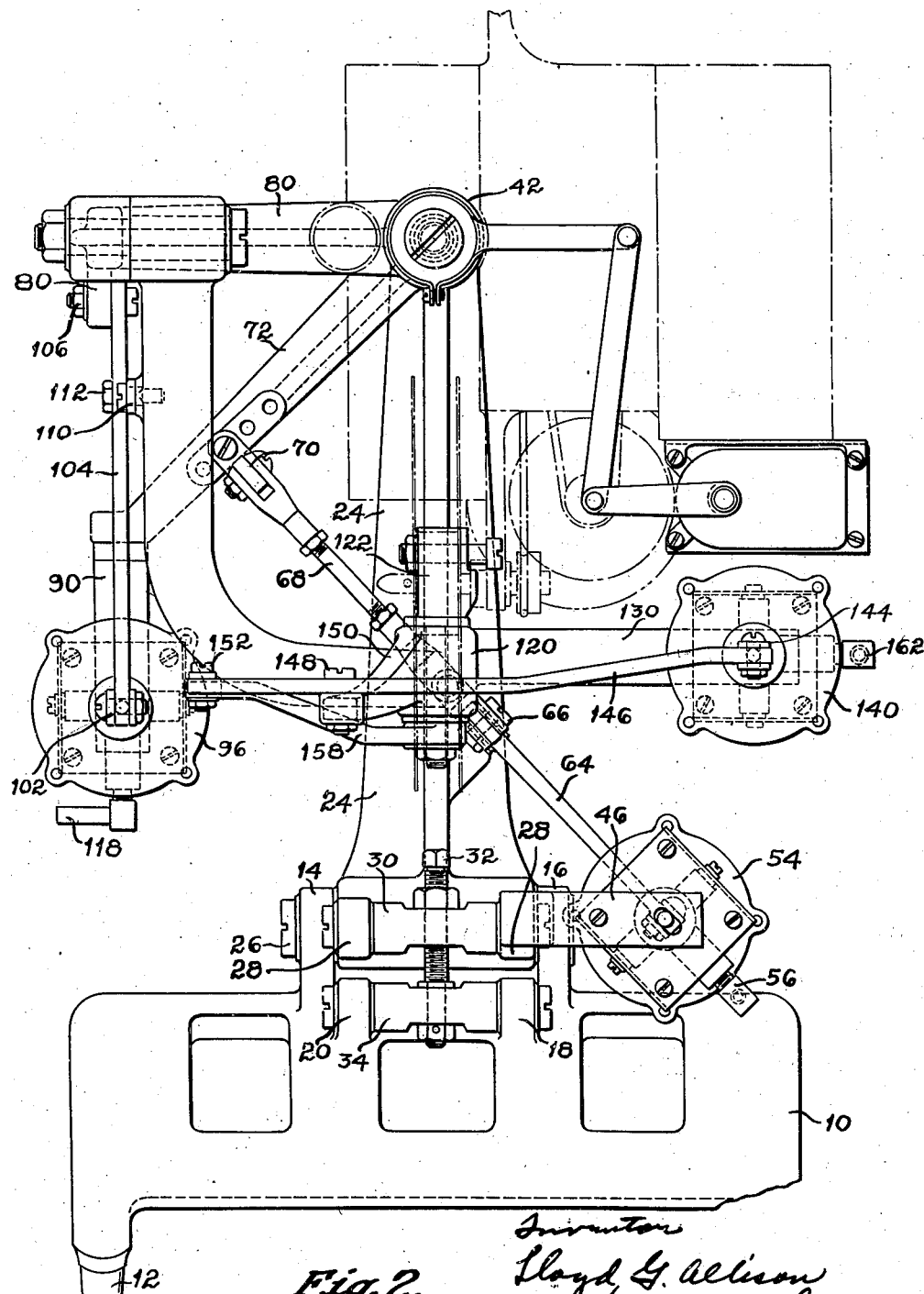
Figure 2 is an end elevation as viewed from the right of Figure 1.
Figure 3:
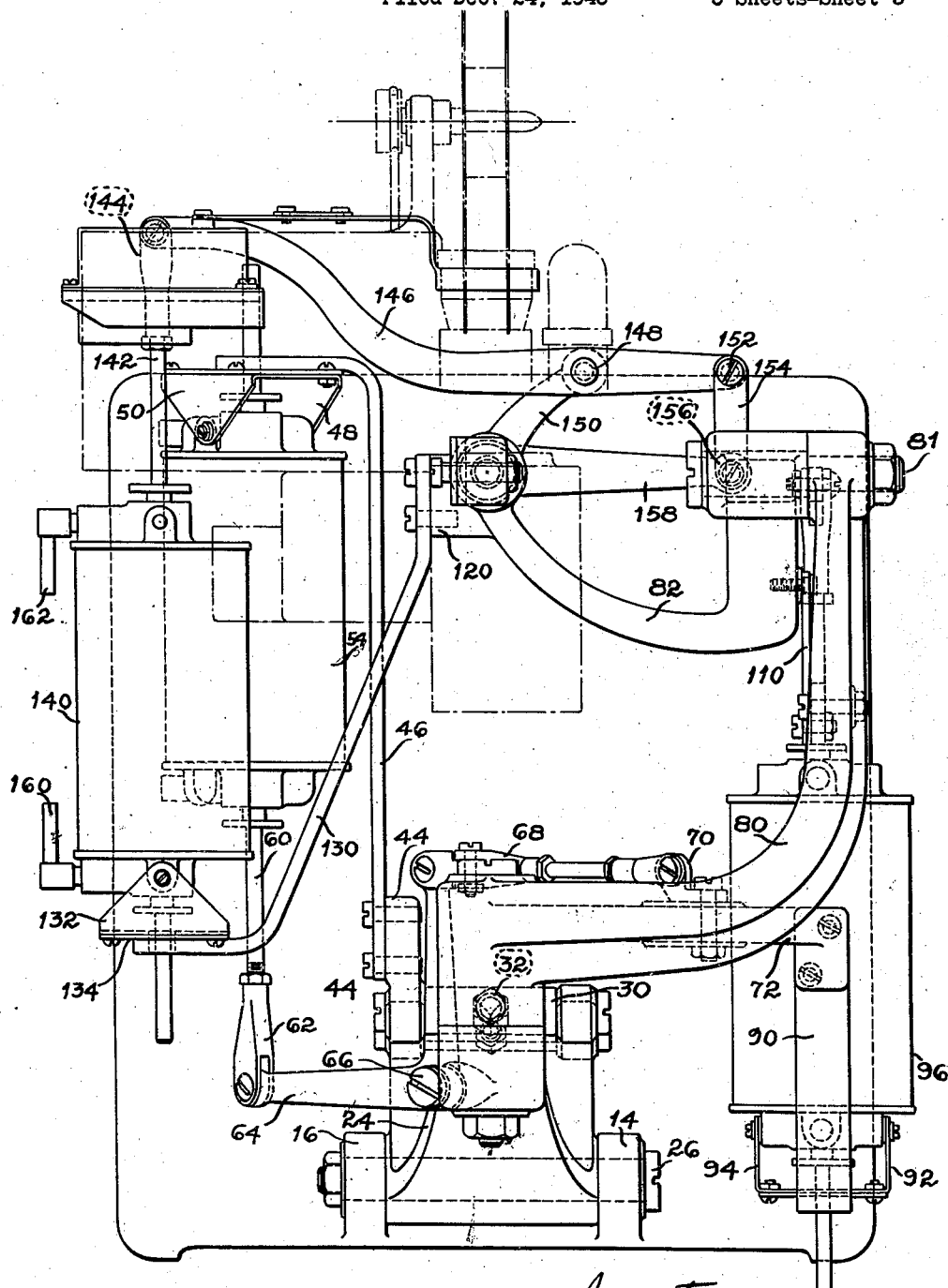
Figure 3 is a top plan view of the device shown in Figures 1 and 2.

If a fluid is admitted to the passage 56, so as to actuate the piston to the left, as viewed in Figure 1, the piston rod 60 will actuate the bell crank lever 64 in a counterclockwise direction, as viewed in Figure 3, so as to rotate the oscillatory bracket member 42 in a counterclockwise direction, as viewed in Figure 2. If fluid is admitted to the passage 58, the piston rod 60 will be actuated to the right, as viewed in Figure 1, so as to oscillate the bell crank lever 64 in a clockwise direction, as viewed in Figure 3, to thereby rotate the oscillatory bracket member 42 in a clockwise direction as viewed in Figure 2.

The oscillatory bracket member 42 is integral with an arm 80 having mounted therein a pivot 81 pivotally supporting a bracket 82 mounted for oscillatory movement upon pivot 81 in a plane substantially normal to the axis of rotation of the oscillatory member 42. The mechanism for oscillating the bracket 82 will now be described.

The arm 72 at its remote end, as best seen in Figures 1 and 3, supports a bracket 90 having fixedly attached thereto a pair of bracket plates 92 and 94. These bracket plates pivotally support a cylinder 96 provided with a piston rod 100 connected to a bifurcated coupling unit 102 pivotally attached to one end of a lever 104 having its opposite end pivotally attached at 106 to the arm 80. A link 110 is pivoted at 112 to the lever 104 and pivotally attached at 114 to the bracket 82. This structure is best seen in Figure 1. Fluid may be admitted to the cylinder 96 through the intake opening or passage 116 or the intake opening or passage 118 communicating with opposite ends of the cylinder 96. As may best be seen by referring to Figure 1, if fluid is admitted through the passage 116, the piston rod 100 will be actuated to the right, so as to oscillate the lever 104 in a counterclockwise direction about the pivot 106 and thereby oscillate the bracket 82 in a counterclockwise direction about the pivot 81. If fluid is admitted through the passage 118, the bracket 82 will be oscillated in a clockwise direction.

The lower end 120 of the bracket 82, as viewed in Figure 1, provides a pivotal support for a mounting member 122 supporting a projector 124. The mounting member 122 may be oscillated about the vertical pivot 126 by a mechanism that will now be described.

The lower end 120 of the bracket 82 supports a bracket 130, as best seen in Figure 3, supporting a pair of bracket plates 132 and 134, having pivotally attached thereto the cylinder 140, provided with a piston rod 142 having attached thereto a piston, not shown, mounted within the cylinder 140. The outer end of the piston rod 142 is provided with a bifurcated coupling unit 144 having pivotally mounted therein a lever 146 pivoted about a fixed pivot 148 mounted on an arm 150 integral with the bracket 82. The end of the lever 146 opposite the coupling unit 144 is provided with a pivot 152 pivotally attached to a link 154 having the opposite end 156 pivotally attached to an arm 158. The arm 158 is non-rotatably attached to the mounting member 122, so that as the arm 158 is oscillated, the mounting member 122 also oscillates.

The cylinder 140 is provided with a pair of fluid intake openings or passages 160 and 162, one for each end of the cylinder. If fluid is admitted through the passage 160 into the cylinder, the piston rod 142 will be actuated upwardly, as viewed in Figure 3, to oscillate the lever 146 in a clockwise direction about the pivot 148, to thereby oscillate the mounting member 122 and the parts carried thereby in a clockwise direction, as viewed in Figure 3. If fluid is admitted through the passage 162, the direction of oscillation of the mounting member 122 will be reversed, or in a counterclockwise direction, as viewed in Figure 3. This pivot may be referred to as the vertical axis, about which the projector is oscillated.

Mode of operation

From the foregoing structure, it can readily be seen that the pictures projected by the projector may be orientated, may be raised or lowered on the screen or may be moved to the left or right on the screen. Each of these movements of the projector may be made without in any manner causing other movements. This is made possible by mounting the cylinders and actuating mechanism on the support of the pivot for the parts to be adjusted. The projector may be orientated or oscillated by admitting the fluid through the passage 56 or 58 of the cylinder 54, so as to oscillate the bracket 42, either in a clockwise or a counterclockwise direction, as viewed in Figure 2. As the bracket 42 is oscillated, the arm 80, the bracket 82 and the mounting member 122 are oscillated in unison and thereby the projector 124 is oscillated.

If it is found desirable, the projected picture may be raised or lowered vertically on the screen by admitting fluid to the intake passage 116 or the intake passage 118, so as to oscillate the bracket 82 and with it members 122 and 124, to raise or lower the picture projected by the projector 124.

If it is found desirable to shift the picture on the screen either to the left or to the right, this may be accomplished by admitting fluid to the intake openings or passages 160 or 162 of the cylinder 140 respectively. By so doing, the mounting member 122 is oscillated about its pivot, thereby shifting the projector 124 either to the left or right, depending upon which intake opening is supplied with fluid.

The pivots are preferably all aligned so as to intersect at a point near the lens, so that as the projector is oscillated, rotated or orientated the effective distance from a point on the screen to the lens remains substantially constant. By this arrangement the projector remains in focus after once being focused, irrespective of the adjustments of the projector. This is very important, for the reason that if the pivots do not intersect near the lens or at the lens, adjustments of the projector would throw it out of focus.

Thus it is possible to project upon the screen a picture of an airplane that normally would be flying toward or away from the observer. This airplane may be raised or lowered on the screen by admitting fluid to the proper cylinder. It may be moved to the left or to the right on the screen by admitting fluid to the proper cylinder for so actuating the projector. Or, the plane may be banked to the left or to the right by admitting fluid to the cylinder that orientates the projector or tilts the projector about the axis of the beam of light, thereby orientating the projected view of the airplane upon the screen. These movements may take place simultaneously or in seriatim. Two of the movements are preferably correlated, that is, the movement that orientates or banks the airplane on the screen and the one that shifts the airplane to the left or to the right on the screen, so as to simulate the movements of an actual airplane in flight.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A mounting assembly for a projector, said mounting assembly including means for oscillating the projector about a horizontal pivot normal to the ray of light used in projecting an image thereby raising or lowering the image upon the screen, means for oscillating the projector about a vertical pivot thereby shifting the image to the right or left, and means for oscillating the projector about a horizontal pivot normal to the first mentioned pivot thereby orientating the image upon the screen.

2. A mounting assembly for a projector, said mounting assembly including a base, a standard mounted upon the base, a pivotally mounted supporting member mounted for oscillatory movement upon the standard, fluid responsive means mounted upon the standard for actuating said pivotally mounted supporting member, a second pivotally mounted supporting member mounted for oscillatory movement upon the first supporting member, fluid responsive means mounted upon the first supporting member for actuating the second supporting member, and means for interconnecting the projector to the second supporting member, said interconnecting means being mounted for oscillatory movement with respect to the second supporting member so that the projector may be oscillated by oscillating one of the supporting members and it may be oscillated by oscillating said interconnecting means.

3. A mounting assembly for a projector, said mounting assembly including a base, a standard mounted upon the base, a pivotally mounted supporting member mounted for oscillatory movement upon the standard, fluid responsive means mounted upon the standard for actuating said pivotally mounted supporting member, a second pivotally mounted supporting member mounted for oscillatory movement upon the first supporting member for actuating the second supporting member, and a third pivotally mounted supporting member mounted for oscillatory movement upon the second supporting member, fluid responsive means mounted upon the second supporting member for actuating the third supporting member, said third supporting member supporting the projector which may be oscillated by oscillating any one of the supporting members.

4. A mounting assembly for a projector, said mounting assembly including a support, a pivotally mounted supporting member mounted for oscillatory movement upon the support, fluid responsive means mounted upon the support for actuating said supporting member, a second pivotally mounted supporting member mounted for oscillatory movement upon the first supporting member, fluid responsive means mounted upon the first supporting member for actuating the second supporting member, and a third pivotally mounted supporting member mounted for oscillatory movement upon the second supporting member, fluid responsive means mounted upon the second supporting member for actuating the third supporting member, said third supporting member supporting the projector which may be oscillated by oscillating any one of the supporting members.

5. A mounting assembly for mounting an object for oscillation in trihedral planes, said mounting assembly including a support, a pivotally mounted supporting member mounted for oscillatory movement in one plane, means for oscillating the pivotally mounted supporting member, a second pivotally mounted supporting member mounted for oscillatory movement in a plane intersecting the first mentioned plane, said second supporting member being pivotally mounted upon the first supporting member, a third pivotally mounted supporting member pivotally mounted upon the second supporting member for oscillatory movement in a plane intersecting the first two planes, and means carried by the second supporting member for actuating the third supporting member.

LLOYD G. ALLISON.